(12) United States Patent
Liu et al.

(10) Patent No.: US 8,818,910 B1
(45) Date of Patent: Aug. 26, 2014

(54) SYSTEMS AND METHODS FOR PRIORITIZING JOB CANDIDATES USING A DECISION-TREE FOREST ALGORITHM

(71) Applicant: Comrise, Inc., Hazlet, NJ (US)

(72) Inventors: Sincia Liu, Hazlet, NJ (US); Fan Jiang, Hazlet, NJ (US); Robert J. Bigini, Basking Ridge, NJ (US)

(73) Assignee: Comrise, Inc., Hazlet, NJ (US)

( * ) Notice: Subject to any disclaimer, the term of this patent is extended or adjusted under 35 U.S.C. 154(b) by 0 days.

(21) Appl. No.: 14/090,225

(22) Filed: Nov. 26, 2013

(51) Int. Cl.
 G06Q 10/10 (2012.01)
 G06Q 10/06 (2012.01)
 G06Q 30/08 (2012.01)
 G06Q 10/00 (2012.01)
 G06Q 30/02 (2012.01)

(52) U.S. Cl.
 CPC .................. *G06Q 10/1053* (2013.01)
 USPC ......................................... 705/321

(58) Field of Classification Search
 CPC .................................. G06Q 10/1053
 USPC .................................. 705/1.1–912
 See application file for complete search history.

(56) References Cited

U.S. PATENT DOCUMENTS

| | | | |
|---|---|---|---|
| 6,728,695 B1 * | 4/2004 | Pathria et al. | 1/1 |
| 7,562,059 B2 * | 7/2009 | Scarborough et al. | 706/21 |
| 7,606,778 B2 * | 10/2009 | Dewar | 706/21 |
| 8,046,251 B2 * | 10/2011 | Scarborough et al. | 705/7.17 |
| 8,180,777 B2 * | 5/2012 | Duchon et al. | 707/738 |
| 8,306,942 B2 | 11/2012 | Chen et al. | |
| 8,396,732 B1 * | 3/2013 | Nies et al. | 705/7.12 |
| 2002/0046199 A1 * | 4/2002 | Scarborough et al. | 706/21 |
| 2002/0107853 A1 * | 8/2002 | Hofmann et al. | 707/7 |
| 2011/0078154 A1 | 3/2011 | Rickman et al. | |
| 2012/0130915 A1 | 5/2012 | Diaz et al. | |
| 2012/0215795 A1 | 8/2012 | Phelon et al. | |
| 2012/0246168 A1 | 9/2012 | Srivastava et al. | |
| 2012/0330708 A1 | 12/2012 | Khan | |
| 2013/0031015 A1 | 1/2013 | Schneider | |
| 2013/0198099 A1 | 8/2013 | Hyder et al. | |
| 2014/0122355 A1 * | 5/2014 | Hardtke et al. | 705/321 |

OTHER PUBLICATIONS

Breiman, Leo, "Random Forests," Machine Learning, 2001, pp. 5-32, vol. 45, Kluwer Academic Publishers, The Netherlands.
Genuer, Robin, et al., "Variable Selection Using Random Forests," Published in Pattern Recognition Letters, 31, 14 (2010), pp. 2225-2236, Version 1, Nov. 21, 2012.
Siroky, David S., "Navigating Random Forests and Related Advances in Algorithmic Modeling," Statistics Surveys, vol. 3, (2009), pp. 147-163.
Archer, Kellie J. et al., "Empirical Characterization of Random Forest Variable Importance Measures," ScienceDirect, Computational Statistics & Data Analysis, 52 (2008), pp. 2249-2260.

* cited by examiner

*Primary Examiner* — Jonathan Ouellette
(74) *Attorney, Agent, or Firm* — K&L Gates LLP

(57) ABSTRACT

Computer-based systems and methods for prioritizing a list of job candidates for a job opening(s) with a hiring firm use the Random Forest algorithm, in which a number of decision trees are generated and the job candidates' respective probabilities of being the right fit for the hiring firm and for the position(s) are computed using the forest of decision trees. The job candidates may then be ranked according to their computed hiring probability. Non-conventional variables can be used, such as social media-related variables and external industry variables, such as the candidates' driving records. Other non-conventional variables that can be used include results from a personality or behavior assessment, results from a third-party skill assessment, and performance evaluations for prior projects or jobs of the candidates.

18 Claims, 5 Drawing Sheets

| Catergory | Field | Description | Standardized Format |
|---|---|---|---|
| API | Updated Time | System Updated time | MM/DD/YYYY |
| | Original Sort | Original sequence of candidates from ATS | Integer |
| Education | School Name | All the Undergraduate and Graduate schools candidate attended | Name List, e.g. "Harvard University" |
| | Education Degree | Highest Degree Level among all past educations | Degree List, e.g. "Ph.D" |
| | Degree required by Job | Information from Job Description | |
| | GPA | GPA of each Undergraduate and Graduate schools | e.g. x.xx /4.00 |
| | Certification | Whether candidate has any certifications both in school and at work | Certification List, e.g. "Teaching Certification" |
| | Honor | Whether candidate has any honors or awards both in school and at work | Honor List, e.g. "Scholarship" |
| Work Experience | Start Date of each Assignment | For each assignment, including those in the same company. Up to 20 of the most recent ones. | MM/DD/YYYY |
| | End Date of each assignment | | |
| | Title of each assignment | | String(no more than 10 words), e.g."GUI Developer" |
| | Employer List | List of past unique employers | Name List, e.g. "Comrise Technology" |
| | Title required by Job | Information from Search Criteria | String(no more than 10 words), e.g."GUI Developer" |
| Skills | SkillSet (from candidate work experience) | Parsed from candidates resume | Set of words, e.g. "C++" |
| | SkillSet (or Job Requirement) | Information from Search Criteria | |
| Applicant Information | Candidate Address | Candidate's current living address | String(including State) e.g. "New Jersey/NJ" |
| | Position's Location | Information from Job Description | |
| | Application Time | The time the candidates apply for jobs | MM/DD/YYYY |
| Resume Structure | Total character count/Total words count/page count/raw text | Any of those is enough to build the model. The preferrance is from the left to right. | Integer/Plain Text |
| | Assignment Description | Collect sensitive words which recruiters are interested in | Plain Text |
| Performance Information | Personality Traits | Personality traits test results | Set of words, e.g. "Ego-driven" |
| | Performance Feedback | Employee working performance Evaluation | Integer/Plain Text, e.g. Score/ "Meets", "Exceeds" |
| | ... | Performance Variable A | ... |
| Social Media Information | Influencer Score | Candidates' presence and scores | Integer/Plain Text |
| | Klout Score | Scores utilized social media to reflect the breadth and strength of one's online social influence | Integer from 1 to 100 |
| | ... | Social Media Variable A | ... |
| External Industry Information | Driving Records | Records of driving history | Integer/Plain Text |
| | ... | External Industry Variable A | ... |
| | ... | External Industry Variable B | ... |

Fig. 2

SYSTEMS AND METHODS FOR PRIORITIZING JOB CANDIDATES USING A DECISION-TREE FOREST ALGORITHM

BACKGROUND

Sometimes it can be chaotic for a firm to find the right candidate to hire for an open job position because the firm may have hundreds, thousands, or even hundreds of thousands of candidates that are available in the firm's resource/resume database. Some order can be brought to this chaos by scoring the job applicants based on skill set match. Such scores currently are typically computed based on the number of times keywords related to the position appear in the candidates' resumes. For example, if a firm is looking to hire a JAVA programmer, the candidates could be scored based on the number of times "JAVA" appears in their resumes. Such candidate scoring systems, however, are not ideal and subject to manipulation.

SUMMARY

In one general aspect, the present invention is directed to computer-based systems and methods for prioritizing a list of job candidates for a job opening(s) with a hiring firm. In particular, the Random Forest algorithm is used, in which a number of decision trees are generated (e.g., 250 or more, and preferably about 500) and the job candidates' respective probabilities of being the right fit for the hiring firm and for the position(s) are computed using the forest of decision trees. The job candidates may then be ranked according to their computed hiring probability. In addition, rather than merely using conventional resume-related information (e.g., work experience, skills, etc.) as the variables in the decision tree, non-conventional variables can be used, such as social media-related variables and external industry variables, such as the candidates' driving records. Other non-conventional variables that can be used include results from a personality or behavior assessment, results from a third-party skill assessment, and performance evaluations for prior projects or jobs of the candidates.

Prioritizing the candidates in such a manner can be very important to the hiring firm because often the hiring firm is competing with other firms for the same candidates. Prioritizing the candidates based on statistically significant variables allows the hiring firm to initially focus on the highest rated candidates. There is no such prioritization in prior art techniques that merely filter candidates based on skill set matches.

These and other benefits of the invention will be apparent from the description below.

FIGURES

Various embodiments of the present invention are described herein by example in conjunction with the following figures, wherein:

FIG. 2 is a table that depicts an application programming interface (API) for transmitting data about the job candidates according to various embodiments of the present invention;

DESCRIPTION

In one general aspect, the present invention is directed to computer-based systems and methods that prioritize candidates for an open job position(s) based upon the probability that the candidates are the right fit for the hiring firm and for the open job position(s), as related to the other candidates for the position. A decision-tree model is used to predict the hiring probabilities for each of the candidates relative to each other. A decision tree is a flowchart-like structure in which an internal node represents a test on an attribute or variable, with each branch coming out of the node representing the outcome of the test. The tree terminates in a number of leaf nodes (or leaves), which represent class labels, i.e., decisions taken after computing the attributes. In this case, the decisions are whether to hire or not hire the candidates based on their attributes. In particular, a Random Forest algorithm (RFA), in which a great number of trees are generated and used for classification, is used to predict the hiring probabilities for the candidates. The resulting predicted probabilities can be used to prioritize the candidates.

Figure 1:
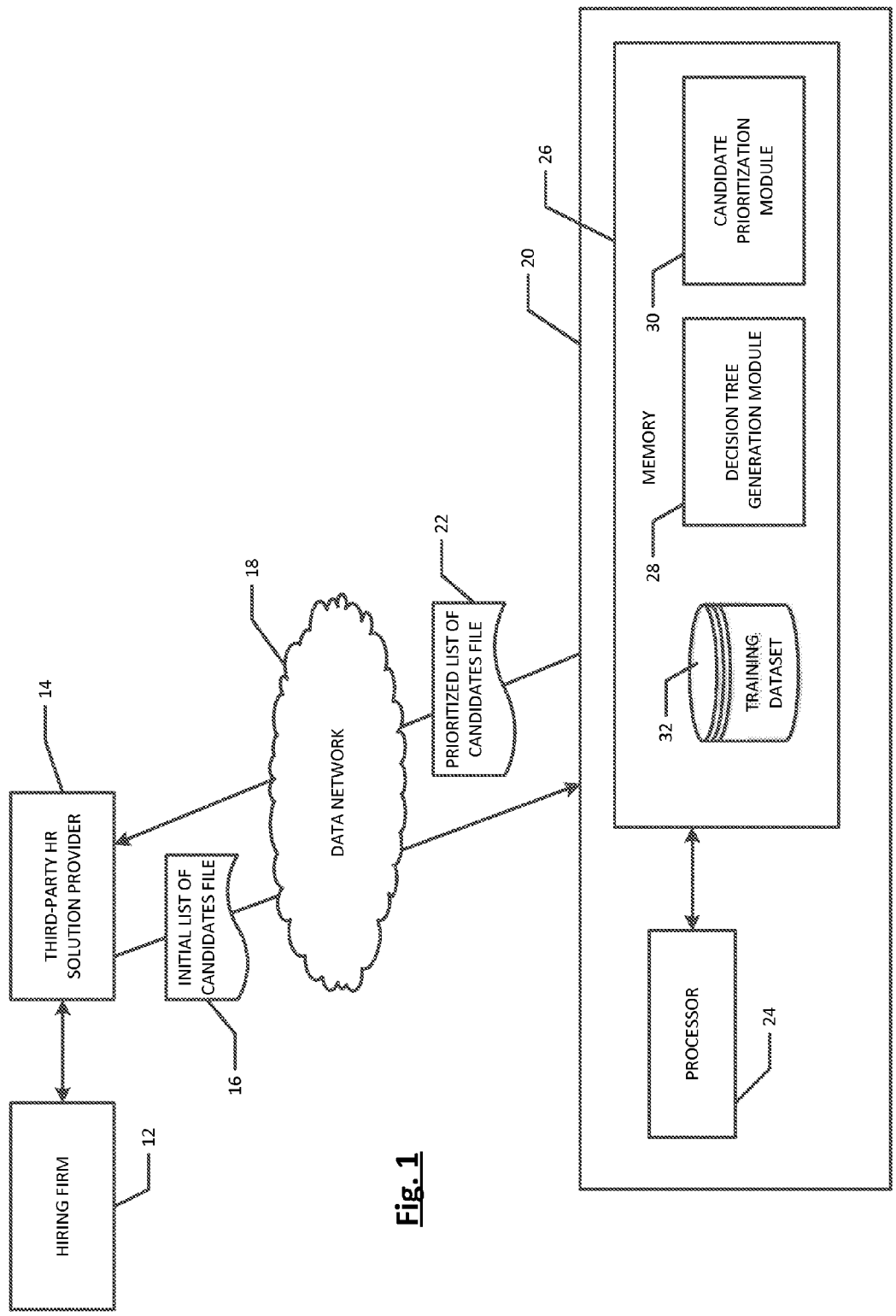
FIG. 1 is diagram of a computer-based system according to various embodiments of present invention for prioritizing job candidates.

FIG. 1 is a simplified block diagram of an exemplary computer-based system 10 for prioritizing the candidates according to one embodiment of the present invention. In this diagram, suppose that a firm 12 wishes to hire one or more candidates to fill a corresponding number of open job positions. In many instances, the hiring firm 12 may work with a third-party human resources (HR) solution provider 14 to develop an initial list of candidates 16 for the job openings, although such a third-party HR provider is not required. The third-party HR solution provider 14, working with the hiring firm 12, may use any suitable technique for developing the list of candidates. For example, it could use known skill set scoring techniques (e.g., keyword counts for resumes) for candidates in the resume databases of the hiring firm and/or the third-party HR solution provider 14 to develop the initial list 16.

As shown in FIG. 1, the third-party HR solution provider 14 (or any other party, such as the hiring firm 12 if a third-party HR solution provider is not used) transmits a data file 16 with the initial list to a candidate prioritization computer system 20 via data network 18. This data file 16 additionally includes data about the candidates, which the candidate prioritization computer system 20 uses to compute the probabilities. The data network 18 may be any suitable data network for transmitting such data files. For example, the data network 18 preferably is an IP network such as the Internet, an intranet, an extranet, etc. It could also use other types of communication protocols, such as Ethernet, ATM, etc., and it could include wired and/or wireless links.

The candidate prioritization computer system 20 (sometimes referred to herein simply as "computer system 20") prioritizes the initial list of candidates and transmits a file 22 with the prioritized list of candidates back to the third-party HR solution provider 14 (or other intended party as the case may be) via the data network 18 (or a different data network). The computer system 20 may include at least one processor 24 and at least one memory unit 26 (only one of each is shown in FIG. 1 for the sake of simplicity). The memory 26 may store software that is executed by the processor 24. In particular, the memory 26 may store a decision tree generation module 28 and a candidate prioritization module 30. The decision tree generation module 28, when executed by the processor 24, causes the processor 24 to generate the forest of decision trees used in the Random Forest algorithm. The candidate prioritization module 30, when executed by the processor 24, causes the processor 24 to compute the probabilities that the candidates in the list 16 are the right fit for the hiring firm 12 and the open position(s), using the forest of decision trees generated by the decision tree generation module 28. Historical candidate data for generating and training the decision trees (i.e., "training dataset") may also be stored in a database 32 in the memory 26. The memory 26 may be embodied as solid state memory (e.g., ROM), hard disk drive systems, RAID, disk arrays, storage area networks (SANs), and/or any other suitable system for storing computer data and software. In addition, the memory 26 may comprise caches, including web caches and database caches. Parts of the memory 26 may be part of the computer system 20 or connected to the computer system 20 via a network connection (e.g., a LAN).

In various embodiments, an application programming interface (API) is used with the file 16 to transmit the initial list of candidates and related candidate data to the computer system 20. FIG. 2 illustrates an example of one such suitable API. The data for the candidates is used by the computer system 20 to either identify the candidate or to calculate the candidate's likelihood of being hired. As such, some of the categories of information about the candidates may relate to nodes of the decision trees used to calculate the probability of the candidate being hired, as described further below. These categories of data may include, as shown in FIG. 2:

Education-related data, such as school name(s), highest degree level, degree required by the open position, GPA for each undergraduate and graduate school, any certifications the candidate may have, and any honors that the candidate may have won;

Work experience-related data, such as the start and end dates for each assignment, the candidate's title for each assignment, a list of past unique employers, and the title required by the particular job opening sought to be filled;

Skill-related data, such as skillset data parsed from the candidate's resume and the skillset required by the particular job opening sought to be filled;

Applicant information data, such as the candidate's address, the location of the particular job opening sought to be filled, and the time that the candidate submitted his/her application;

Resume structure data, such as data about the size of the candidate's resume (e.g., word count, character count, page count, raw text, etc.), and data about the particular job opening sought to be filled (such as sensitive words in which recruiters are interested);

Performance information, such as personality trait or behavior test results, performance feedback or evaluation data (e.g., performance evaluations from prior projects or jobs), third-party skill assessment results, and any other identified performance variables;

Social media data about the candidate, such as scores for the candidate's presence or status on various social media sites, such as LinkedIn, twitter, Google+, Facebook, etc., the candidate's Klout score, and any other applicable social media variables (e.g., number of friends, contacts, etc.); and External industry data, such as driving record data (e.g., suspended license or not, etc.) and any other applicable external industry variables.

The computer system 20 uses this data to prioritize the candidates. As mentioned above, the computer system 20 preferably uses the Random Forests algorithm (RFA) to build an ensemble (or "forest") of decision trees that are used to prioritize the candidates. The RFA is a non-parametric ensemble approach to machine learning that uses bagging to combine decisions of multiple classification (or decision) trees to classify data samples, in this case the candidates for the open job positions in terms of whether they are the right fit for the open position and the hiring firm 12. More details about the RFA may be found in L. Breiman, "Random Forests," Machine Learning 45 (1):5-32 (2001) and A. Liaw et al., "Classification and Regression by randomForest," R News, Vol. 2/3, p. 18 (2002), both of which are incorporated herein by reference.

Figure 3:
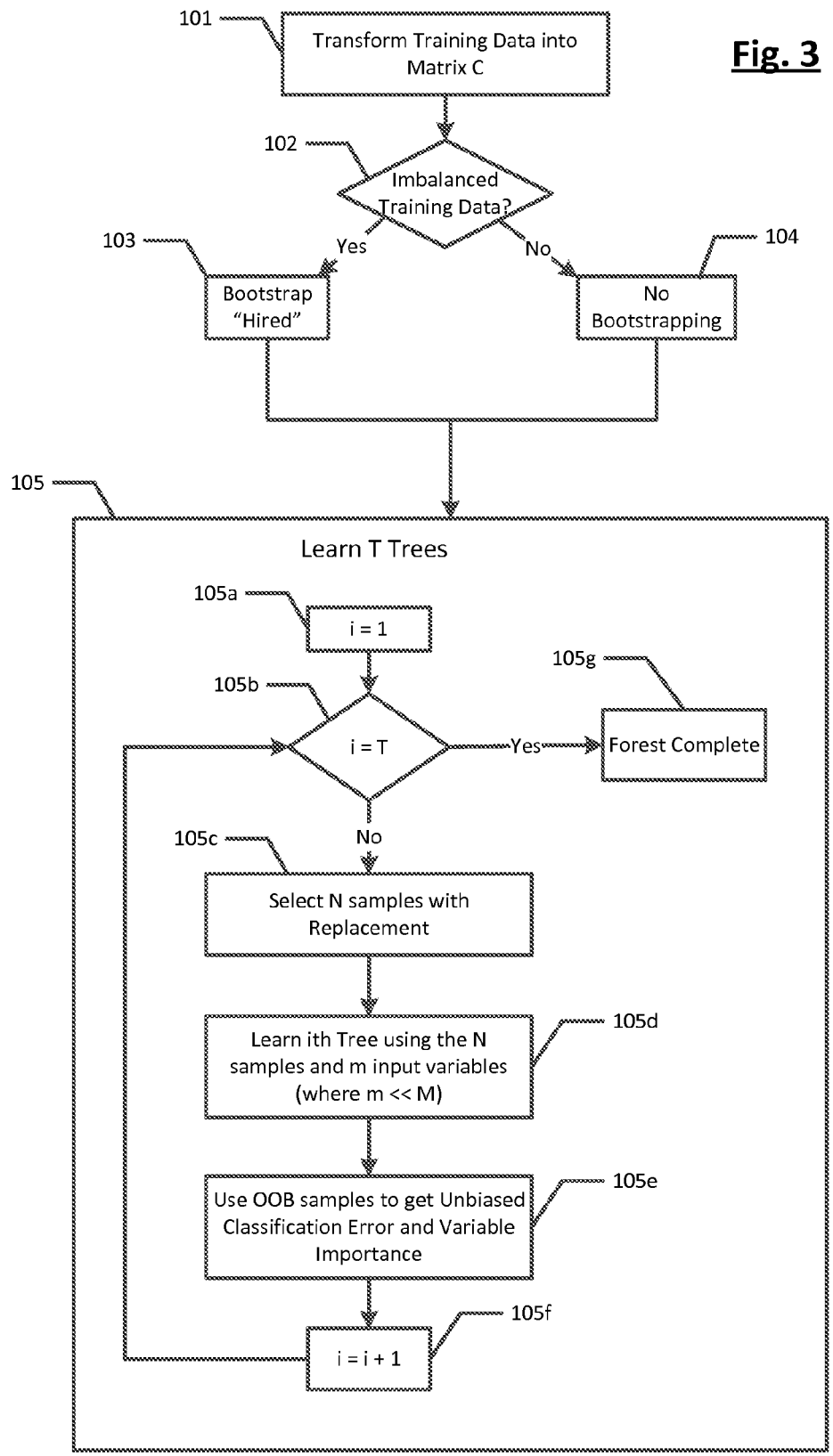
FIG. 3 is a flowchart of a process for generating the forest of decision trees according to various embodiments of the present invention.

In various embodiments of the present invention, the processor 24, executing the code of the decision tree generation module 28, generates a number (a "forest" or "ensemble") of decision trees that are used to classify the candidates. FIG. 3 is simplified flow chart of a process that the processor 24 performs, when executing the code of the decision tree generation module 28, to generate the decision trees. At step 101, the training dataset 32 is transformed into actionable numeric values (if not already done so). This step 101 may include generation of a N×M data matrix, denoted C, where each of the N rows represents one candidate in the training dataset 32 (not the same candidates as in the initial list 16) and each column M represents one input variable used in the classification. The input variables can be things such as: distance from job; education-related variables (e.g., highest degree obtained, degree match, major, schools attended, school and/or department rank, GPA, honors, certificates, etc.); resume-structure-related variables (e.g., resume length, keyword hits, application time, etc.); work experience related variables (prior positions, average length, shortest, longest, mean, standard deviation, title level match, etc.); skill-related variables (e.g., whether the candidate possesses certain skills, language skills); performance-related variables (e.g., personality/behavior assessment results, skill assessment results, performance evaluations); social media related variables; external industry related variables (e.g., driving record); and any others that are deemed relevant. In particular, input variables that have been found to be important in some contexts include:

Whether the candidate's current title level is the same as/higher than/lower than the title of the open position;

The number of promotions and the number of demotions in the candidate's work history;

The difference between last assignment title level and first assignment title level;

The number of projects the candidate was assigned for each past employer;

The total number of assignments in the candidate's work history;

The number of assignments that are shorter than 1 year in the past 3 assignments;

Occurrence of relevant personal traits key words; and

Past work performance score.

Also, the input variables can exclude inputs such as age, race and gender so that these traits are not factored into the hiring process.

In various embodiments, a general training dataset 32 can be used; that is, a training dataset that is not specific to the hiring firm 12 and/or the open position(s) sought to be filled. In such cases, historical training data of a job placement firm (or a number of such firms) can be aggregated and used to construct the trees. In other embodiments, a specific training dataset can be used that is specific to either the hiring firm 12 or the position(s) sought to be filled or both. In such cases, the training dataset can be gathered from the hiring firm's past hiring activities and specific hiring requirements. In either case (general or specific), larger training data are generally better and lead to better classifiers, all other things being equal. Also, in either case the number of "hired" candidates may be much smaller than the number of "unhired" candidates, which can result in an unsatisfactorily imbalanced dataset. Accordingly, at step 102, the training dataset is examined to see if it is unsatisfactorily imbalanced. That is, for example, if the ratio of hired to unhired is less than a threshold value (e.g., 1:5), then at step 103 the training dataset can be resampled (e.g., bootstrapped) until it is at an acceptable level (e.g., between 1:5 and 1:2). Conversely, if the ratio of hired to unhired in the training dataset is acceptable at step 102, no bootstrapping is required as denoted by block 104.

Next, at step 105, a large number, denoted T, of decision trees (e.g., a forest) are generated based on the training dataset 32. The number of trees, T, can be on the order of hundreds, such as 250 or more, and preferably is or is about 500 trees making sure the algorithm is convergent. Each of the trees splits the training dataset 32 into subsets based on an attribute value test, and gives a classification (e.g., "hired" or "not hired"). When predicting the probability, each input row vector (which corresponds to a candidate in the training set) is put down each of the trees in the forest and gets a vote for "Chosen" (e.g., hired) or "Not Chosen" (e.g., not hired). The probability of hiring a candidate is calculated by taking the number of votes for Chosen for the candidate, divided by the total number of trees in the forest.

Figure 4:
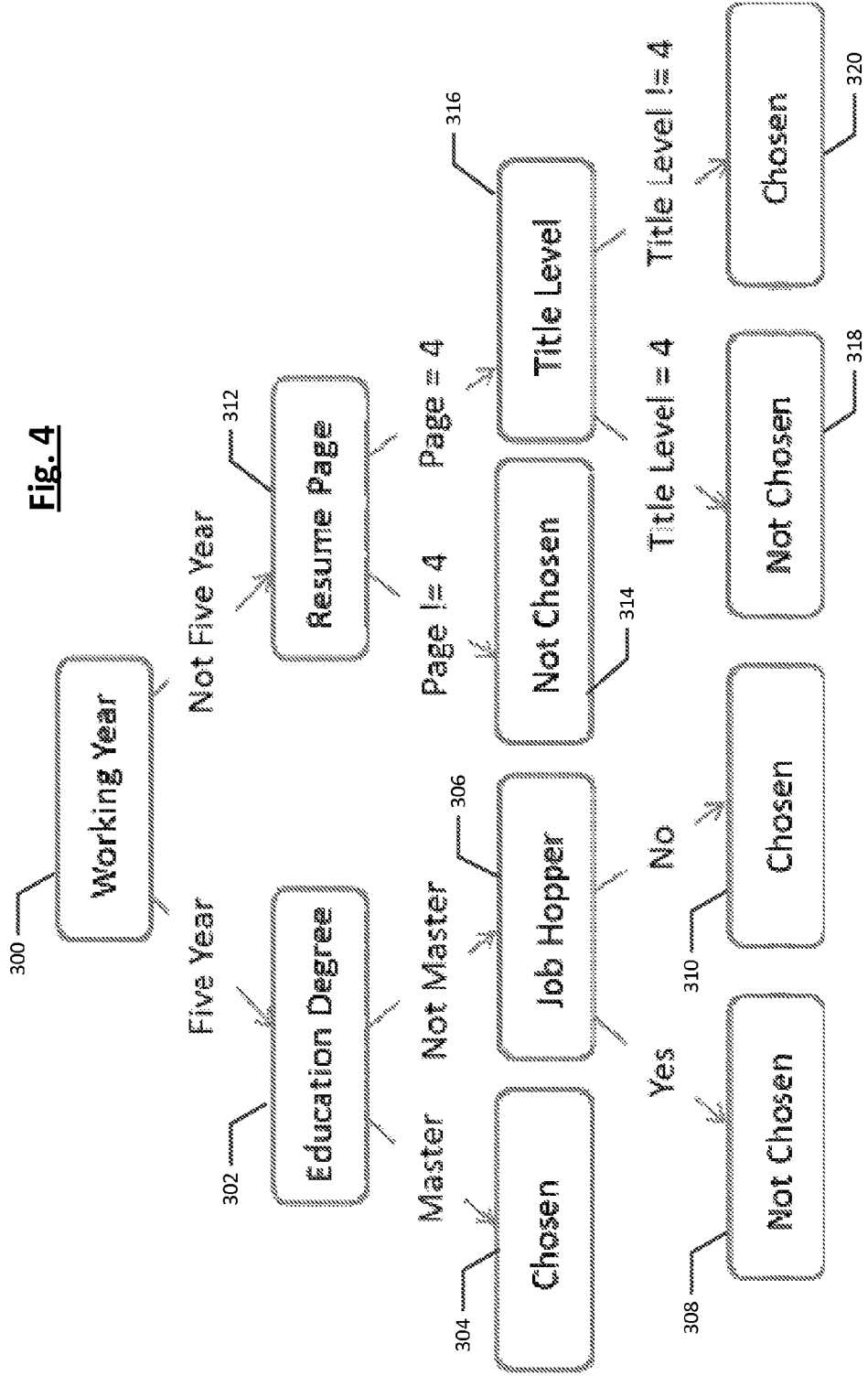
FIG. 4 depicts a sample decision tree according to various embodiments of the present invention.

FIG. 4 gives one simple example of a possible decision tree. In this example, the root node 300 is "working year." If the candidate has been working for five years or more, the tree branches to the left to the "education degree" node 302. Here, if the candidate has a master's degree or higher, the tree branches to left to one of the "Chosen" leaves 304. Going back to the "education degree" node 302, if the candidate does not have a master's degree or higher, the tree branches to the right to the "job hopper" node 306. Here, if the candidate satisfies some specified criteria for being a job hopper (e.g., no jobs for longer than x years), the tree branches to the left to a "Not Chosen" leaf 308. Conversely, if the candidate does not satisfy the job hopper criteria, at node 306 the tree branches to the right to a "Chosen" leaf 310.

Going back to the root node 300, if the candidate has not been working for 5 or more years, the process branches to the right to "resume page" node 312. Here, in this example, if the candidate's resume has less than four pages, the candidate is not chose at leaf 314. If the candidate's resume is four pages or more, the tree branches to the right to the "Title Level" node 316. Here, if the candidate previously had a position associated with title level 4 (e.g., vice president, senior vice president, director, executive director, etc.), the tree branches to a "not chosen" leaf 318. Conversely, if the candidate previously did not attain title level 4, the tree branches to a "chosen" leaf 320.

Referring back to FIG. 3, as part of step 105, to generate the forest of T decision trees, a counter, denoted i, may be set initially to a value of 1 at step 105*a*. That counter is then tested to see if it equals T at step 105*b* to see if the desired number of trees for the forest has been built. If not, more trees need to be generated as the counter has not yet incremented to the value of T. So at step 105*c*, in various embodiments, the ith decision tree is learned. In this process, according to various embodiments, N sample points (same as the number of candidates (rows) in the matrix C) are selected at random with replacement from the original dataset 32 to be treated as the training dataset for the tree. "With replacement" means that particular candidate samples can be selected multiple times to get to the N sample points, and some of the candidate samples are not selected at all. The samples that are not selected can be called the "out-of-bag" (or OOB) samples, and preferably about one-third of the original samples are left out. That is, the percentage of samples selected may be expected to be, or converge to, (1-1/e), or about 63.2%, when the total number of sample points goes to infinity. These OOB samples may be used to obtain an unbiased estimate of the classification error and variable importance for the decision tree, as described further below.

Particularly in the case where general historical candidate is used as the training dataset for the trees, the number of candidate samples can be very large (e.g., on the order of tens of thousands). In such circumstances, the number of unique samples in each bootstrap sample that are selected can be expected to be about 63.2%, with the remainder (36.8%) being duplicates. The unique examples (with duplication) in the original dataset are used to learn the decision trees, with the samples left out used to determine the unbiased estimate of the classification error and variable importance.

Then, at step 105*d* the ith tree is learned. In various embodiments, an optimal number m, much less than M (the number of columns in the matrix C), of variables is decided by the algorithm, such that, at each node in the tree, starting from the top (or root node) and working down, m out of M input variables are selected at random and the best split (according to some criteria) on these m variables is used to split the node. "Best" is usually a measure of homogeneity of the target variables with the subsets, and any suitable technique may be used for determining the best split, such as Gini (population diversity), entropy, information gain ratio, the Chi-square test, or any other suitable technique.

Next, at step 105*e*, the OOB samples are used to determine the unbiased classification error and variable importance for the ith tree. In various embodiments, the unbiased classification error can be determined by putting each OOB case left out in the construction of the ith tree down the ith tree to get a classification. In this way, a test set classification is obtained for each case in about one-third of the trees. At the end of the run, take j to be the class that got most of the votes every time case n was OOB. The proportion of times that j is not equal to the true class of n averaged over all cases is the OOB error estimate. The OOB error can be used to determine the best split. Also, the OOB can be used to determine the optimal value for m and the total number of tree to construct. The optimal number m may be determined by, for example, initially setting it to M divided by 3 (or m=M/3), where M is the total number of columns in the C matrix. When tuning m, at each iteration, m is inflated (or deflated) by a predetermined value (e.g., 2), and the iteration stops when the OOB error value does not improve by at least a threshold value (e.g., 0.05). Once m is chosen, m variables are selected randomly and uniformly on each sample to build the trees.

One way to assess the variable importance is with random permutation of the m variables. For example, for every tree grown in the forest, put down the OOB cases and count the number of votes cast for the correct class. The values of variable m can then be randomly permuted in the OOB cases and put the randomly permuted cases down the tree. The number of votes for the correct class in the variable-m-permuted OOB data is subtracted from the number of votes for the correct class in the untouched OOB data. The average of this number over all trees in the forest is the raw importance score for variable m. If the values of this score from tree to tree are independent, then the standard error can be computed by a standard computation, such as dividing the raw score by its standard error to get a z-score, ands assign a significance level to the z-score assuming normality. If the number of variables is very large, forests can be run once with all the variables, then run again using only the most important variables from the first run. For each case, consider all the trees for which it is OOB. The percentage of votes for the correct class in the variable-m-permuted OOB data can be subtracted from the percentage of votes for the correct class in the untouched OOB data. This is the local importance score for variable m for this case.

With the ith tree complete, the counter i is incremented by 1 at step 105*f*, and the process returns to step 105*b*, where the counter i is again compared to T, the desired number of trees. If i does not equal T, the next tree is learned. On the other hand, if i equals T, then the forest is complete, shown at step 105*g*, meaning that the desired quantity of trees, T, is constructed.

In growing the T trees according to this process, the value of m is preferably held constant to grow the entire forest (that is, each of the T trees is grown with the same value of m) and each decision tree preferably is grown to the largest extent possible without any pruning.

Also, in various embodiments, the step of determining the unbiased classification error and/or variable importance (step 105*e*) may be performed as each tree is generated (as shown in FIG. 2 inside the loop) or it could be performed for each tree after all of the trees are generated (i.e., outside the loop), or combinations thereof (i.e., every so many trees).

Figure 5:
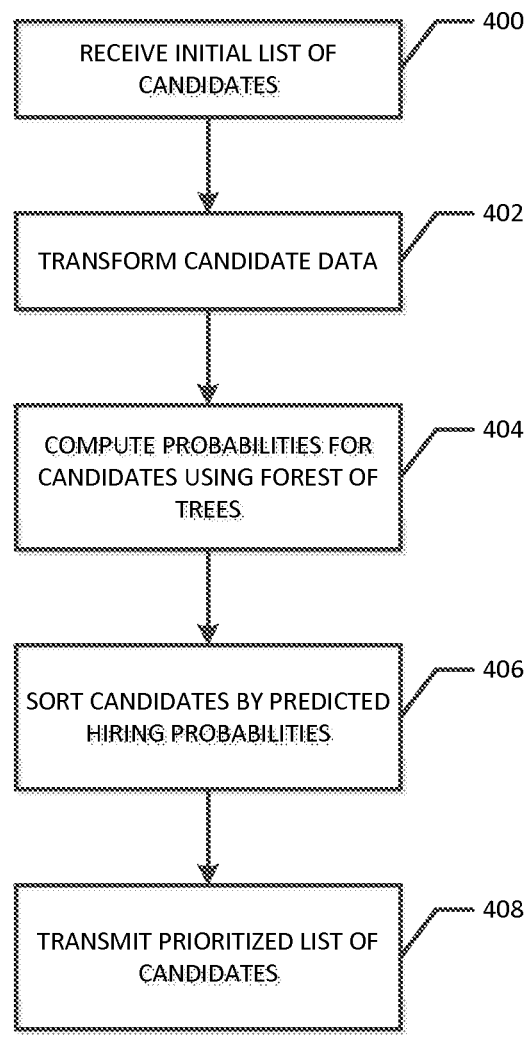
FIG. 5 is a flowchart depicting a process for prioritizing the job candidates according to various embodiments of the present invention.

With the forest of decision trees generated, the initial list of candidates in file 16 can be prioritized. FIG. 5 is a flowchart of a process that the processor 24 may perform, when executing the code of the candidate prioritization module 30, according to various embodiments of the present invention. At step 400, the computer system 20 receives the initial list of candidates 16 from the sender (e.g., the third party HR solution provider 14 or the hiring firm 12), and at step 402 the data for the candidates is transformed to a suitable form, preferably a N'×M' matrix, where N' is the number of candidates in the initial list and M' is the input variables (primes are used here to differentiate these value from the dimensions of the C matrix used to learn the forest of decision trees). Again, the input variables can exclude inputs such as age, race and gender so that these traits are not factored into the hiring process.

Next, at step 404, the N'×M' matrix is put down each of the T trees in the forest to determine the probability for each candidate. This is done by averaging the outputs of the decision trees for each candidate. For example, if a particular candidate is classified as hired for S of the T trees (and conversely unhired for T-S trees), that candidates probability is S divided by T (or S/T). Then, at step 406 the candidates can be prioritized by sorting them by their predicted hiring probabilities (computed at step 404) from highest probability to lowest probability. Then at step 408, the prioritized list of candidates 22 can be transmitted by the computer system 20 back to the intended recipient (e.g., the third party HR solution provider 14 and/or the hiring firm 12).

As mentioned above, the non-resume related variables are used in various embodiments to classify and prioritize the candidates. These non-resume related variables can include, for example, social media related variables (e.g., active accounts with certain social media sites, Klout scores, etc.), external industry information (e.g., driving record history data, etc.), and performance information (e.g., results from a personality/behavior traits test, skill assessment, employee work performance evaluation, etc.). Thus, these variables can be associated with nodes for some of the decision trees of the forest.

As should be apparent from the above-description, different training datasets will lead to different forests of decision trees. In particular, different variables or attributes will prove more significant in classifying the samples. For example, when a specific training dataset is used that is specific to the hiring firm 12 and/or the position sought to be filled, variables that are uniquely significant to that firm 12 and/or the position are more likely to be used in the trees than if the trees were generated using a general training dataset. For example, if a hiring firm 12 is seeking to hire a consultant, and the trees are generated based on this condition, whether a candidate previously had a position as a consultant is more likely to be a node in the decision trees than if the general training dataset is used independent of the position sought to be filled. As another example, if a retail firm is seeking to hire short-term, seasonal employees, and this condition is factored into the training, previous short-term job assignments for the candidates may prove to be an important factor (node) in classifying the candidates.

Prioritizing the candidates in the manner described above can be very important to the hiring firm 12. Many times the hiring firm 12 may be competing with other firms for the same candidates. Prioritizing the candidates based on statistically significant variables, as described above, allows the hiring firm to initially focus on the highest rated candidates. There is no such prioritization in prior art techniques that merely filter candidates based on skill set matches. Also, in FIG. 1 the decision tree generation module 28 and the candidate prioritization module 30 are shown as part of one computer system 20. It should be recognized that in other embodiments, these modules may be distributed across multiple, networked computer systems to distribute processing resources. This may further accelerate the process for prioritizing the candidates.

Referring back to FIG. 1, although the third-party HR solution provider 14 is shown external to the candidate prioritization computer system 20 in this figure, in other embodiments the candidate prioritization computer system 20 may receive the initial list of candidates from an internal system or process. For example, another system or process of the candidate prioritization computer system 20 could generate the initial list of candidates for prioritization.

In various embodiments, therefore, the present invention is directed to computer-based systems and methods for prioritizing a list of job candidates for a job opening with a hiring firm 12. According to various embodiments, the method comprises the step of generating, by the candidate prioritization computer system 20, a quantity T decision trees, where T is greater than or equal to 250 (preferably 500), based on a training dataset 32. The T decision trees each classify historical candidates in the training dataset 32 into hired or unhired classes, and each decision trees of the T decision trees is generated by selecting historical candidates in the training dataset 32 randomly with replacement to train the decision tree. The method further comprises, for each of the job candidates, determining, by the computer system 20, a classification of the job candidate (e.g., hired or unhired) according to each of the T decision trees. The method further comprises computing, by the computer system 20, a hiring probability for each job candidate based on a ratio of (i) a total of number of times the job candidate was classified as hired to (ii) T (the total number of trees generated). The method also comprises the step of ranking, by the computer system 20, the job candidates by hiring probability to generate a prioritized list of the job candidates.

In various implementations, the candidate prioritization computer system 20 may the list of job candidate from a remote computer system (e.g., a computer system associated with the hiring firm 12 and/or the HR solution provider 14) via a data network 18, and transmit the prioritized list of the job candidates to the remote computer system. Also, there may be N historical candidates in the training dataset 32, and N historical candidates may be selected from the training dataset 32 randomly with replacement to construct each decision tree. In particular, between 60% and 70% unique historical candidates may be selected.

Additionally, the process of generating the T decision trees may comprise generating a N×M matrix, where each of the N rows in the matrix corresponds to one of the historical candidates in the training dataset, and each of the M columns corresponds to an input variable for classifying the candidates. In such cases, to construct each of the T decision trees, at each node of each of the T decision trees, m out of the M input variables are selected at random, and the best split on the m input variables is determined to split the node.

Further, as described above, at least one of the input variables comprises a social media network variable, such as whether a candidate has a social media network account (e.g., Facebook, twitter, LinkedIn, Google+). The social media network variable may also comprise (additionally or alternatively) an online social media influencer score variable for the candidates, such as the candidates' Klout scores. Also (additionally or alternatively), at least one of the input variables may comprise an external industry variable such as a driving record variable for the candidates. Further, at least one of the input variables (additionally or alternatively) may comprise performance-related variables (e.g., results from a personality traits test, employee work performance evaluation, etc.)

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, SSDs or hard disk drives. A computer-readable medium may also include memory storage that is physical, virtual, permanent, temporary, semipermanent, and/or semitemporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software and/or data, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for prioritizing a list of job candidates for a job opening with a firm, the system comprising:
   at least one computer system comprising at least one processor and at least one memory unit that is in communication with the at least one processor, wherein the at least one processor is programmed to:
   use a Random Forest Algorithm to generate a quantity T decision trees, where T is greater than or equal to 2, and the T decision trees are trained based on a training data set of historical candidates classified into hired or unhired classes, wherein each decision tree of the T decision trees is generated by selecting historical candidates in the training dataset randomly with replacement to train the decision tree; and
   for each of the job candidates, determine a classification of the job candidate for each of the T decision trees;
   compute a hiring probability for each job candidate based on a ratio of (i) a total of number of times the job candidate was classified as hired to (ii) T; and
   rank the job candidates by hiring probability to generate a prioritized list of the job candidates.

2. The system of claim 1, further comprising a remote computer system that sends the list of job candidate to the at least one computer system via a data network, and wherein the at least one processor of the at least one computer system is further programmed to transmit the prioritized list of the job candidates to the remote computer system.

3. The system of claim 1, wherein:
   there are N historical candidates in the training data set; and
   the at least one processor is programmed to select, for the training of each of the T decision trees, N historical candidates in the training dataset randomly with replacement.

4. The system of claim 3, wherein the at least one processor is programmed to generate the T decision trees by performing steps that comprise:
   generating a N×M matrix, where each of the N rows in the matrix corresponds to one of the historical candidates in the training dataset, and each of the M columns corresponds to an input variable for classifying the candidates;
   to construct each of the T decision trees, at each node of each of the T decision trees, selecting randomly m out of M input variables; and
   determining a best split on the m input variables to split the node.

5. The system of claim 4, wherein at least one of the input variables comprises a social media network variable.

6. The system of claim 5, wherein the social media network variable comprises a variable indicative of whether a candidate has a social media network account.

7. The system of claim 5, wherein the social media network variable comprises an online social media influencer score for the candidates.

8. The system of claim 4, wherein at least one of the input variables comprises a driving record variable for the candidates.

9. The system of claim 4, wherein at least one of the input variables comprises a result of a behavioral assessment.

10. A computer-based method for prioritizing a list of job candidates for a job opening with a firm, the method comprising:
    using a Random Forest Algorithm to generate, by a computer system that comprises at least one processor and at least one memory unit, a quantity T decision trees, where T is greater than or equal to 2, and the T decision trees are trained based on a training data set of historical candidates classified hired or unhired classes, wherein each decision tree of the T decision trees is generated by selecting historical candidates in the training dataset randomly with replacement to train the decision tree; and
    for each of the job candidates, determining, by the computer system, a classification of the job candidate for each of the T decision trees;
    computing, by the computer system, a hiring probability for each job candidate based on a ratio of (i) a total of number of times the job candidate was classified as hired to (ii) T; and
    ranking, by the computer system, the job candidates by hiring probability to generate a prioritized list of the job candidates.

11. The method of claim 10, further comprising:
    receiving, by the computer system, the list of job candidate from a remote computer system via a data network; and
    transmitting, by the computer system, the prioritized list of the job candidates to the remote computer system.

12. The method of claim 10, wherein:
    there are N historical candidates in the training data set; and
    selecting, for the training of each of the T decision trees, comprises selecting N historical candidates in the training dataset randomly with replacement.

13. The method of claim 12, wherein generating the T decision trees comprises
    generating a N×M matrix, where each of the N rows in the matrix corresponds to one of the historical candidates in the training dataset, and each of the M columns corresponds to an input variable for classifying the candidates;
    to construct each of the T decision trees, at each node of each of the T decision trees, selecting randomly m out of M input variables; and
    determining a best split on the m input variables to split the node.

14. The method of claim 13, wherein at least one of the input variables comprises a social media network variable.

15. The method of claim 14, wherein the social media network variable comprises a variable indicative of whether a candidate has a social media network account.

16. The method of claim 14, wherein the social media network variable comprises an online social media influencer score for the candidates.

17. The method of claim 13, wherein at least one of the input variables comprises a driving record variable for the candidates.

18. The method of claim 13, wherein at least one of the input variables comprises a result of a behavioral assessment.

* * * * *